United States Patent
Giberson

(10) Patent No.: US 9,841,055 B2
(45) Date of Patent: Dec. 12, 2017

(54) VERTICAL GUIDE BEARING IMPROVEMENTS

(71) Applicant: Melbourne F. Giberson, Glenmoore, PA (US)

(72) Inventor: Melbourne F. Giberson, Glenmoore, PA (US)

(*) Notice: Subject to any disclaimer, the term of this patent is extended or adjusted under 35 U.S.C. 154(b) by 0 days.

(21) Appl. No.: 15/047,367

(22) Filed: Feb. 18, 2016

(65) Prior Publication Data

US 2016/0245338 A1 Aug. 25, 2016

Related U.S. Application Data

(60) Provisional application No. 62/118,597, filed on Feb. 20, 2015.

(51) Int. Cl.
 *F16C 33/10* (2006.01)
 *F16C 17/02* (2006.01)
 *F16C 33/04* (2006.01)

(52) U.S. Cl.
 CPC .......... *F16C 33/1045* (2013.01); *F16C 17/02* (2013.01); *F16C 33/1065* (2013.01); *F16C 33/1085* (2013.01); *F16C 33/046* (2013.01); *F16C 2300/20* (2013.01); *F16C 2360/00* (2013.01); *F16C 2380/26* (2013.01)

(58) Field of Classification Search
 CPC .. F16C 33/1045; F16C 33/046; F16C 33/105; F16C 33/106; F16C 33/1065; F16C 33/1085; F16C 2300/34; F16C 17/02; F16C 2300/20; F16C 2360/00; F16C 2380/26
 See application file for complete search history.

(56) References Cited

U.S. PATENT DOCUMENTS

| | | | | |
|---|---|---|---|---|
| 3,977,738 A | * | 8/1976 | Sundstrand | F16C 17/06 384/415 |
| 4,416,555 A | * | 11/1983 | Tomioka | F16C 17/06 384/398 |
| 8,246,313 B2 | | 8/2012 | Brady et al. | |
| 9,593,716 B2 | * | 3/2017 | Haussmann | F03B 11/066 |
| 2010/0329890 A1 | | 12/2010 | Brady et al. | |

OTHER PUBLICATIONS

Trumpler, Paul Robert, Design of Film Bearings, 1966, 15 pages, The MacMillian Company, New York, Collier-MacMillan Limited, London.
Transmission & Bearing Corp., A Division of Turbo Research, Inc., Catalog of TRI Journal Bearings, 2015, 23 pages, Lionville, Pennsylvania.

* cited by examiner

Primary Examiner — Alan B Waits
(74) Attorney, Agent, or Firm — Polster Lieder

(57) ABSTRACT

A vertical radial guide bearing of fixed circular bore construction surrounds a journal attached firmly to a rotating shaft, is lubricated via pot lubrication means, has a bearing bore surface that is shaped to include viscosity oil pumps that are situated below the surface of the oil in the pot, are adjacent the bottom of the bearing, have associated supply ports remote from the journal, and have associated discharge grooves that extend vertically up the bearing bore surface to a circumferential groove adjacent the top of the bearing, wherein the viscosity oil pumps are sized to pump oil quickly up the grooves so as to develop an oil film between the journal and bearing surfaces, this film generated by normal hydro-dynamic action having sufficient pressure and thickness to rapidly separate the journal and bearing surfaces and to keep them separated.

19 Claims, 10 Drawing Sheets

VERTICAL GUIDE BEARING IMPROVEMENTS

CROSS-REFERENCE TO RELATED APPLICATIONS

This application claims the benefit of U.S. Provisional Application 62/118,597, filed Feb. 20, 2015, the disclosure of which is hereby incorporated by reference.

STATEMENT REGARDING FEDERALLY SPONSORED RESEARCH

Not applicable.

BACKGROUND OF THE INVENTION

Large vertical motor driven pumps are used to pump large amounts of water in almost every power plant that exists. Primary examples are cooling water circulation pumps. They pump water from oceans, rivers, lakes, or cooling towers through the condensers to condense the steam within the boiler and steam turbine flow path. In most cases, the power of the motor-pump ranges from 3000 hp (2200 kw) to 10,000 hp (7500 kw), the shafts and journals range from 7 to 18 inches (175 mm to 450 mm), and the rotational speeds range from 200 rpm up to approximately 600 rpm, though some may rotate up to 1200 rpm. When operating in service in a normal manner, these pumps rotate either clockwise or counter-clockwise, as the designer intends or the application requires. The arrangements addressed in this document consist of a motor situated above the pump with the pump shaft hard-coupled to the bottom of the motor shaft. In almost all cases, the motor has a thrust bearing and an upper radial guide bearing above the motor and a lower guide bearing below the motor. Usually, the pump shaft has one guide bearing near the top of the pump body and an impeller at the bottom of the pump shaft. At the bottom of the pump body there is an axial flow suction bell through which the water enters the pump. For this class and size of motors and pumps, these vertical radial guide bearings are typically bearings with Babbitt bores, 10 to 16 inches (250 to 400 mm) in diameter and 3.5 to 4.0 inches (90 to 100 mm) in axial (vertical) length, and have a diametral clearance between the journal and bearing on the order of 0.001 inch per inch of diameter (0.001 mm per mm of diameter), or approximately 0.010 to 0.016 inches (0.25 to 0.40 mm). Such a clearance may be called a "close clearance".

In most of these motor-pump arrangements, the thrust bearing and all three guide bearings are lubricated with oil, typically ISO VG 32 or 46 (known as a light viscosity oil or medium viscosity oil) (Note: ISO means International Standards Organization and VG means Viscosity Grade). In certain applications, the guide bearing in the pump is water lubricated using the process water. In this disclosure, oil lubricated bearings are of principal interest. The term "oil" as used herein is to be understood as "a lubricant with sufficient and appropriate viscosity" except where clearly used in a more restrictive sense.

Various methods are used to supply oil to lubricate these bearings. A very reliable method is to have an external motor driven pump, cooler, filter and reservoir package to condition the oil and feed it to each of the bearings and from which to receive drain oil. In this pumping method, known as "pressure fed" lubrication, the external lube oil pump is turned on before the main pump motor, so all of the bearings have lubrication before the motor-pump shaft-line starts to rotate. However, many vertical motor-pump arrangements were built and installed without benefit of an external pumping system as above described, and instead use "pot lubrication" with Babbitt bearings wherein the top of the journal is attached to the shaft and it has an outer wall that extends downward for a distance, perhaps 8 inches (200 mm) leaving a radial gap, approximately 1 inch (25 mm) in radial distance, between the inside surface of this journal wall and the outer surface of the shaft. An inside surface of the stationary pot extends upward in this gap between the journal and shaft. Because there is no seal at the top of the inside surface of the "pot", it is necessary to keep the surface of the oil a suitable distance below the top of the inside wall of the pot, hence, a compromise is required to set the desired level of the oil along the height of the bearing.

Furthermore, there are two types of oil lubricated bearings typically used in these vertical motors and pumps: The earlier design is a fixed bore bearing, with the bore being circular and having diagonal grooves in the Babbitt surface of the bearing that create a mild pumping action driving the oil from the bottom of the bearing up through these grooves to the top of the bearing, thereby lubricating the bearing. A later design is a tilting pad type as shown in Brady, et. al., published application US 2010/0329890 A1 and U.S. Pat. No. 8,246,313 B2, both of which are hereby incorporated by reference. While the tilting pad design is recognized to be an advantageous design relative to fixed bore bearings, this document addresses fixed bore bearings because there are so many of them in service and retrofit fixed bore bearings using designs based on the invention and improvements shown herein would make significant improvements in their operating performance, thereby making it more difficult to justify retrofitting these motors and pumps with tilting pad bearings or pressure fed lubrication.

As a reconfirmation, the present disclosure is concerned with only fixed bore bearings having a circular bore. A common feature in a very large number of these conventional fixed bore bearings is a series of angled grooves in the surface, approximately 0.18 inches (4.5 mm) wide, 0.12 inches (3 mm) deep, at 45 degrees. Almost all motors are designed to rotate in either direction, and the user may select the rotation required for his application. Regarding pumps, almost all pump impellers are shaped to function effectively in only one direction of rotation, but there are circumstances in which reverse flow through the pump can occur which will cause the pump and the attached motor to rotate in the reverse rotational direction. Consequently, the motor manufacturer and the pump manufacturer design their bearings to function and perform adequately in either direction of rotation.

Circumstances in which a motor and/or pump can rotate in one direction or the other are these: (1) When a motor is installed initially, or when it has been removed, serviced, possibly disassembled and reassembled, and then reinstalled, it is uncertain that the 3-phase electric cables will be connected or reconnected to the motor so as to cause the motor to rotate in the reverse direction upon being started. For this reason, a normal step after completing the electrical connections to the motor but before coupling the motor shaft to the shaft of the pump or other load is to "bump start" the motor to confirm that the motor is properly wired so that the motor rotates in the desired direction when started. Typically, in a "bump start", the period of time between pressing the start button and then the stop button is so short that the motor does not reach full speed. In this situation, the pump is not connected to the motor so the pump does not rotate at all. (2) When a pump shaft is connected to a motor shaft and the pump discharge piping is connected to a piping system that can remain pressurized after the subject pump stops rotating by means of a pressurized tank or one or more pumps operating in parallel that continue to operate and pressurize the downstream piping system of all of the pumps, and the check valve (also known as a "one-way valve") in the discharge line from the subject pump fails to close, then the downstream pressure will flow back through the subject pump causing this pump and the connected motor to rotate in the reverse direction. When such a discharge check valve fails to close, then the discharge isolation valve for the subject pump must be closed—either by a power means or manual means—to stop the reverse flow through the pump and to stop the pump and motor from rotating in reverse.

While these bi-rotational circular bore bearings have been in service for decades and are very simple to manufacture and to use, they do have drawbacks. For these vertical radial guide bearings that are typically 10 to 16 inches (250 to 400 mm) in diameter, 3.5 to 4.0 inches (90 to 100 mm) in axial length, the bottom 1.5 inches (37 mm) is below the surface of the oil level in the pot which means that the top 2.0 to 2.5 inches (50 to 63 mm) is above the surface of the oil. When the bearings sit still for a period of time, more than a few days, the oil drains from the journal and bearing surfaces, so that the top 2.0 to 2.5 inches (50 to 63 mm) are dry. On start-up, the motor and pump shafts increase rotational speed rapidly. At the same time, the magnetic forces on the motor rotor tend to pull the motor rotor radially to one side, and because the water flow through the pump almost always flows into a volute with a lateral discharge port, a lateral force component is applied to the impeller. These forces then push/pull the shafts and journals laterally and they are restrained and held in position by reaction forces from the associated bearings. These are illustrative examples of reasons that journal surfaces of vertical motors and pumps can be expected to start in contact with and rub against the respective bearing surfaces.

Being dry, or nearly dry, it is quite common for these guide bearings to have hard dry rubs, leading to Babbitt "wipes" on start-up, including on the first start-up. In this context a "wipe" means that a journal surface has dragged along and rubbed the Babbitt surface with sufficient frictional force to deform or to dislodge an amount of Babbitt and to move it along the surface in the direction of rotation. Sometimes the wipe is merely a "burnish" in which case the surface is only polished, and no other damage occurs. Sometimes the "wipe" is quite severe meaning that there is significant smearing of the Babbitt, generating elevated temperatures in the Babbitt. Occasionally, local temperatures are sufficiently high so as to cause Babbitt to melt and to flow away. Clearly, wiping a Babbitt surface can increase the clearances in the bearing, reducing the ability of the bearing to restrain the motion of the rotor and thereby contributing to high amplitude rotor vibration. These forms of wiping are illustrative of bearing damage that can require a motor-pump to be shut down, sometimes immediately and sometimes at a later time, and can require the bearing(s) to be replaced.

The foregoing leads to these two critical questions: (a) How many rotations of the journals are required before sufficient oil is driven up the angled grooves of a conventional guide bearing to provide adequate lubrication to form a minimum oil film that will permit elasto-hydrodynamic lubrication (lubricated rubbing) instead of dry rubbing? (b) How many rotations of the journals are required before sufficient oil is driven up the angled grooves to provide adequate lubrication to form an oil film that has the "wedge shape" necessary to develop sufficient pressure in the film and sufficient film thickness to keep the journal separated from the bearing, thereby avoiding or stopping rubbing?

To begin to develop a solution to this problem it is very helpful to develop an understanding of the problem. Consequently, a test arrangement duplicating a pot oiled journal bearing was fabricated and initial testing of an existing conventional bearing with alternating diagonal grooves was performed at the normal operating speed of a particular motor-pump, approximately 500 rpm. To see the oil flow patterns within the bearing, the top lip of Babbitt above the circumferential drain groove was machined away. Upon starting the test journal to rotate in the test bearing, the problem was immediately visible to an observer: It took approximately two (2) rotations for the oil to come up one set of angled up-flowing grooves into the circumferential groove, but then the oil immediately went down the other set of grooves with opposite angles, or down-flowing grooves. There was a very small amount of oil circulating in the circumferential oil groove at the top of the bearing, and almost no oil went out through the radial drain oil passageways to the outside to be cooled. Only a limited amount of oil appeared to travel up and down the grooves. Further, one could conclude that when this oil flow reached the bottom of the down-flowing grooves, it continued to flow downward as a jet effectively pushing fresh cooler oil away so that only a small amount of fresh cooler oil would enter the up-flowing grooves.

While the owner/operators are aware of the risks of operating vertical motor-pumps with bearings of this design and are aware that an external pressure-fed pumping system, if implemented, would resolve the bearing damage and rotor vibration problems, they are quite reluctant to change the means of lubrication to an external pump for a number of reasons, including (a) the difficulty to redesign the motor and pump structures to accommodate the required oil conditioning equipment, (b) the cost of the added retrofit equipment, and (c) especially, the cost of the lost production time (measured in hours) necessary to implement the changes.

An object of the present invention is to provide improvements to the design of the existing fixed bore bearings that, for journal bearings that are starting "dry", will provide a substantial reduction of the time period for oil to be driven to the top of the bearing thereby advancing the start-time for elasto-hydro-dynamic lubrication (wet-rubbing) as well as advancing the start-time for a full film of oil to exist in the journal bearing sufficient to permit a proper wedge film shape to develop with pressure and thickness necessary to keep the journals separated from the bearings. It is anticipated that the improvements described herein will provide a significant improvement in the performance of these vertical radial guide bearings during the start-up portion of motor-pump operation in normal rotation, and will function adequately well to provide oil films with adequate pressure and thickness to develop during the few short periods of time that reverse rotation occurs. Initial tests of designs incorporating the invention have shown that these improvements are attained.

The improvements to the designs of conventional fixed bore bearings are based on knowledge of which rotational direction is normally used, and on implementation of selected principles of lubrication theory and practice. One of the fundamental principles of lubrication that is germane to the improvements advanced herein is that the film pressure in and adjacent to any groove has no pressure, that is, 0 psig, and therefore, a film with zero pressure cannot keep the journal from contacting the bearing. The implication is that there should be large areas of Babbitt surface without any grooving so as to be able to develop fully developed wedge shaped oil films that are able to develop sufficient pressures and thicknesses to keep the journal separated from the bearing, recognizing that a compromise must be made to provide an adequate number of grooves of sufficient size to be able to supply adequate new cooled oil to the film.

BRIEF SUMMARY OF THE INVENTION

In accordance with this invention, generally stated, a fixed circular bore guide bearing is located around a journal of a vertical shaft of a motor, pump, or similar rotating machine, and is used to control the radial position and radial vibration of the journal, and by extension, of the associated machine. In the embodiment that is described, the guide bearing comprises a bearing housing or bearing body and certain features machined, milled, and/or drilled into the bearing bore surface and/or into the bearing body that enhance self-lubrication of a vertical guide bearing being lubricated via "pot lubrication" wherein the oil level in the pot is located about one quarter to one half, preferably about one third, of the distance from the bottom of the bearing body toward the top of the bearing body. A principal feature of the improvements is a series of "viscosity oil pumps" situated below the surface of the oil and associated vertical grooves machined into the bearing bore surface that are connected to the discharge ends of the viscous oil pumps and through which oil flows from the viscosity oil pumps to reach a circumferential oil passageway that is machined into the bearing bore surface near the top of the bearing. Viscosity oil pumps are described at pages 90-102, particularly pages 97-100, of the text book entitled "Design of Film Bearings" by Dr. Paul Robert Trumpler (The McMillan Company, New York, 1966, Library of Congress Card Number 66-11212), incorporated by reference herein. A well-known application of a viscosity oil pump is the "pressure dam" journal bearing, commonly used in journal bearings in many different rotating machines. A similar application is a "pressure dam" thrust bearing. While the general concept of a viscosity oil pump cannot be considered to be novel, the use of a viscosity oil pump in vertical guide bearings as described herein is believed to be novel. In the illustrative embodiment described herein, a viscosity oil pump illustratively comprises a shallow slot, or groove, in the bearing bore surface about 0.75 inches (16 mm) in axial length vertically, from 0.5 to 1.0 inches (12 to 25 mm) in circumferential arc length, and about 0.030 inches (0.75 mm) deep, along with a supply port and a discharge port. It functions as follows: As the journal rotates, the journal surface drags a viscous lubricant (oil) from the supply port through the shallow slot (groove) in the direction of rotation, and this increases the pressure in the film in the shallow slot. At the end of the shallow slot, the pressure is sufficient to push oil up the vertical groove to the circumferential channel or groove adjacent the top of the bearing. The larger the axial length and the longer the circumferential arc length of the viscosity oil pump slot, the more oil it can pump up the vertical groove. Limiting the cross-sectional area of the groove reduces the time period for oil to reach the top of the bearing. When a bearing the same size as a conventional bearing was made with the oil viscosity pumps, ports and grooves described herein and subsequently tested in the same test apparatus as a comparable conventional bearing was tested, it took less than one rotation of the journal for a large amount of oil to start to flow out of the top of each vertical groove associated with a viscosity oil pump for the primary direction of rotation. When this bearing with improvements was tested with the journal rotating in reverse rotational direction, the oil flows out of the grooves for the reverse viscosity oil pumps occurred more quickly and were greater than the oil flows out of the diagonal grooves of the conventional bearing.

In the preferred embodiment, the surface of the bearing bore is a liner of Babbitt material chemically bonded to the bore of a steel bearing body. The primary reason that Babbitt is used as the bearing surface material is because particulate matter can embed in the surface of Babbitt with minimal risk of scoring the journal or bearing surfaces. The number of viscosity oil pumps and associated vertical grooves that are used for the primary rotational direction of a journal likely would be six (6) to eight (8), and for the reverse direction, the number of viscosity oil pumps and vertical grooves would equal one-half the number used in the primary direction, or three (3) or four (4), thereby reducing the number of grooves required to be machined into the bearing surface. The viscosity oil pump slots and vertical grooves used for reverse rotation are located adjacent viscosity oil pump slots and vertical grooves for the primary rotation in order to maximize the ungrooved surface area of the bearing. The ports that supply oil to the viscosity oil pump slots for the primary rotation have passageways that are different from the passageways for the supply ports for the viscosity oil pump slots for reverse rotation, as follows: The supply port for the primary rotation consists of a right angled passageway that connects a hole at the leading edge of the primary slot in the Babbitt surface to a hole drilled in the bottom of the bearing body. On the other hand, the supply port for a viscosity oil pump slot for reverse rotation is a straight hole drilled radially through the bearing body, and this passageway connects a hole at the leading edge of the reverse slot in the Babbitt surface to a hole in the outside surface of the bearing body.

When the journal is rotating in the primary direction, a portion of the oil that reaches the circumferential groove adjacent the top of the bearing goes down the vertical grooves associated with the viscosity oil pump for reverse rotation because this viscosity oil pump is now working in reverse, sucking oil from the associated vertical groove and discharging it out through the associated supply port. For reverse rotation, the opposite happens. However, because one set of ends of oil supply passageways is at the bottom of the bearing body and the other set of ends is at the outside surface of the bearing body, there is considerable mixing and cooling of oil in the pot for any oil that does recirculate from one to the other. The separation of the supply ports for primary rotation from those for reverse rotation eliminates the immediate recirculation of hot oil out of a down-flowing groove and into an up-flowing groove such as occurs for a conventional bearing. In the arrangement of the primary embodiment, an increased number of radial passageways are drilled between the circumferential groove near the top of the bearing and the outside of the bearing body. This permits less resistance to the flow of drain oil out of the bearing and over the cooling coils located below the surface level of the oil in the pot. The preferred embodiment also permits the size of the viscosity oil pump to be adjusted in order to control the amount of oil that flows upward through the grooves and into the film of a bearing, and consequently, to control measurably the speed that adequate oil is supplied to the film. Furthermore, the size of the viscosity oil pump also controls the amount of drain oil that passes through the radial drain holes to the cooling coils, generally improving the cooling of all of the oil.

Should the bearing be split into multiple parts so that the bearing can be assembled around a journal or shaft, vertical grooves can be located at split lines rather than in an exposed bearing surface, the objective being to eliminate any step in an ungrooved portion of the bearing surface.

The cooling coils typically are wrapped all the way around the bearing several times, and may have fins or not, as the designer and manufacturer happen to select or otherwise use. The purpose of the cooling coils is to dissipate the heat generated by the shearing of oil in the film between the journal and bearing. Conventional cooling coils are anticipated to be adequate for the bearings that contain improvements as enumerated herein.

The foregoing and other objects, features, and advantages of the invention as well as presently preferred embodiments thereof will become more apparent from the reading of the following description in connection with the accompanying drawings.

BRIEF DESCRIPTION OF THE VARIOUS VIEWS OF THE DRAWINGS

In the accompanying drawings, which form part of the specification:

FIG. 1 is a plan view of a conventional vertical radial guide bearing with an arrow representing one direction of rotation of a journal within a bearing.

FIG. 2 is a cross-sectional view of the bearing of FIG. 1 presenting a form of diagonal grooving in the Babbitted surface of the bearing bore and showing a lube oil flow pattern associated with this form of diagonal grooving for journal rotation as represented in FIG. 1, and in particular, showing the flow of lube oil up and down in a recirculating pattern minimizing the flow of fresh cooled oil that can enter the up-flowing grooves.

FIG. 3 is a plan view of another conventional vertical radial guide bearing with an arrow representing one direction of rotation of a journal within the bearing.

FIG. 4 is a cross-sectional view of the bearing in FIG. 3 presenting another form of diagonal grooving in the Babbitted surface of the bearing bore and showing a lube oil flow pattern associated with this form of diagonal grooving for journal rotation as represented in FIG. 3, and in particular, showing the flow of lube oil up and down in a recirculating pattern again minimizing the flow of fresh cooled oil that can enter the up-flowing grooves.

Figure 8A:
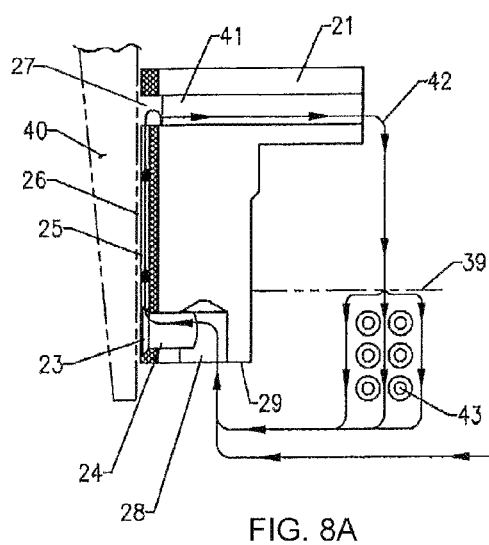
Figure 8B:
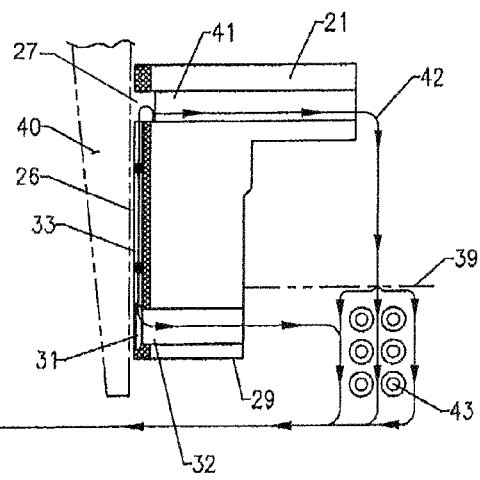

FIG. 8 (FIGS. 8A and 8B) is a schematic view of the oil flow path for a primary viscosity oil pump and an adjacent reverse viscosity oil pump during operation when the journal is rotating in the primary direction of journal rotation. This schematic shows a representative flow pattern for oil entering the supply port for the primary viscosity oil pump with a substantial flow leaving the radial drain holes near the top of the bearing and with a limited flow exiting the supply port for the reverse viscosity oil pump. Both of these flows direct warm drain oil either over or near the cooling coils and then these flows mix together as they approach the entrance to the supply port for the primary viscosity oil pump as the oil continues to circulate through the bearing again and again.

Figure 9A:
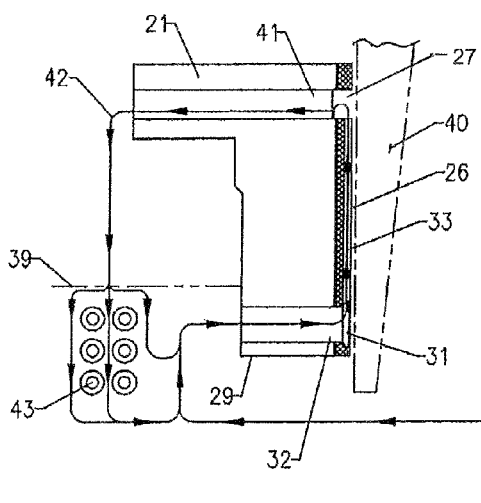
Figure 9B:
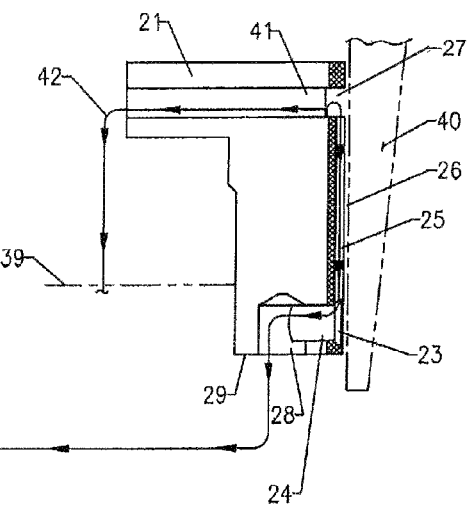

FIG. 9 (FIGS. 9A and 9B) is a schematic view of the oil flow path for a primary viscosity oil pump and an adjacent reverse viscosity oil pump during operation when the journal is rotating in the reverse direction of journal rotation. This shows a representative flow pattern for oil entering the supply port for the reverse viscosity oil pump with a limited flow leaving the radial drain holes near the top of the bearing and with an even more limited flow exiting the supply port for the primary viscosity oil pump. Both of these flows direct warm drain oil either over or near the cooling coils and then mix together with resident oil in the pot as a flow approaches the entrance to the supply port for the reverse viscosity oil pump.

Figure 10:
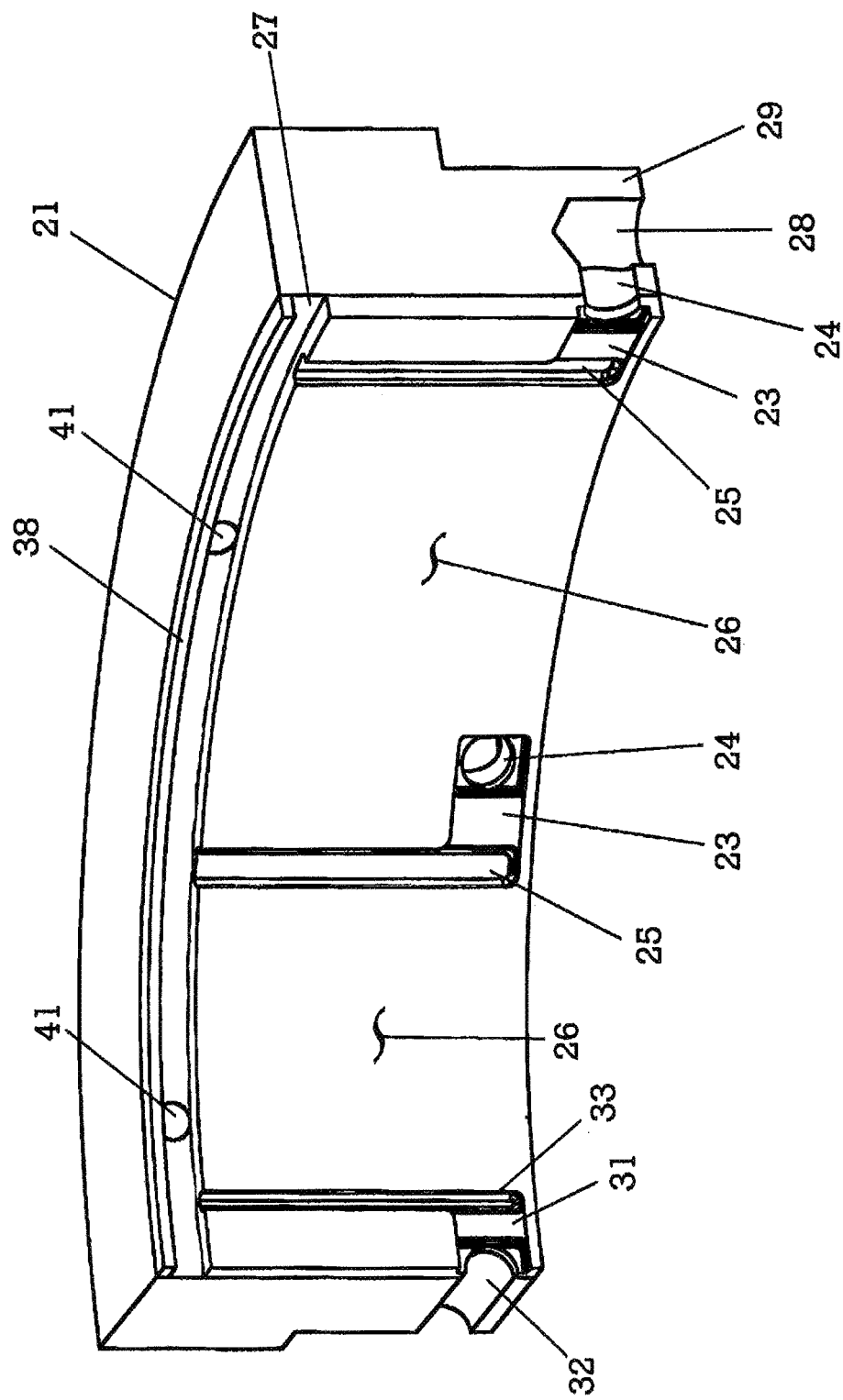

FIG. 10 is a view in perspective of a portion of the bearing of FIGS. 5-9.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
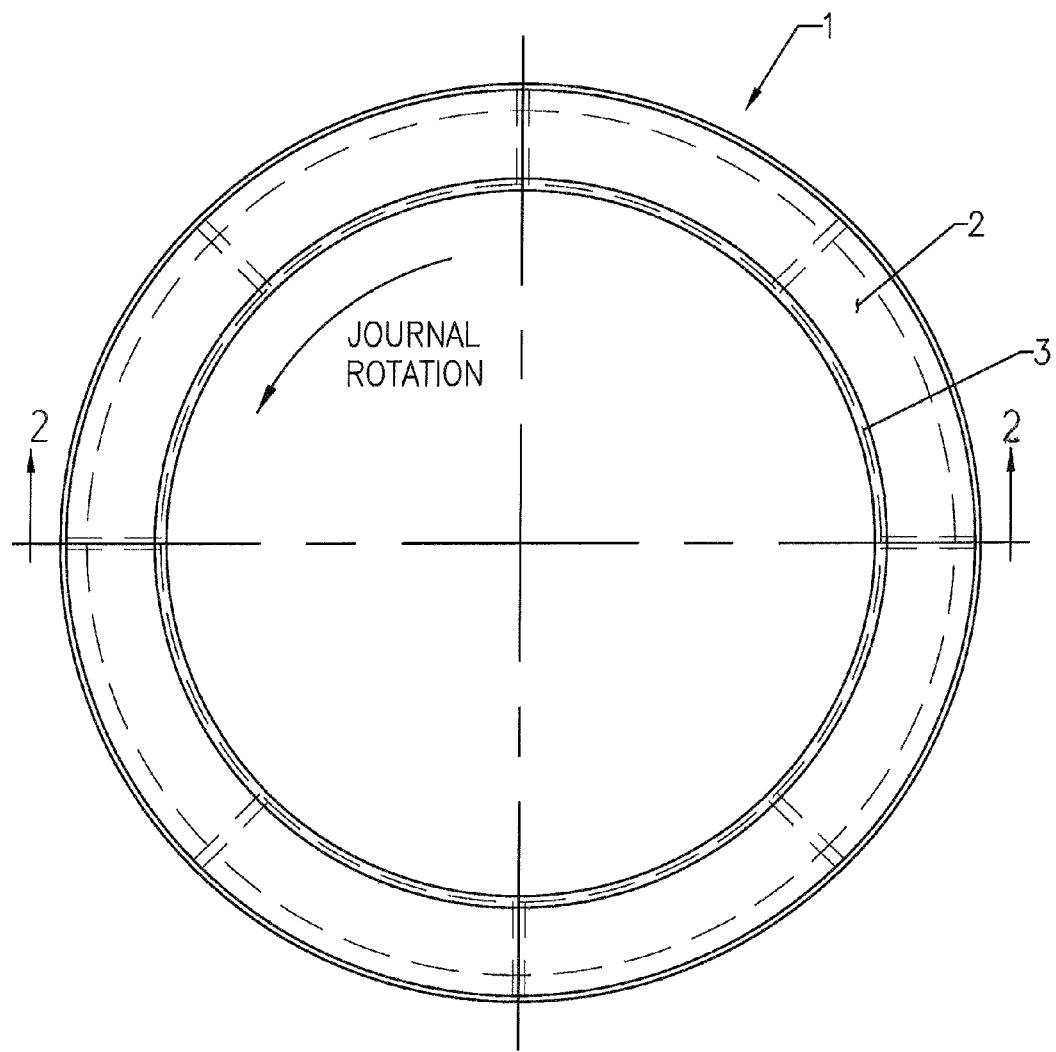

Referring now to the drawing, FIG. 1 is a plan view of a conventional vertical radial guide bearing 1 having a steel body 2 and a Babbitt lining 3.

Figure 2:
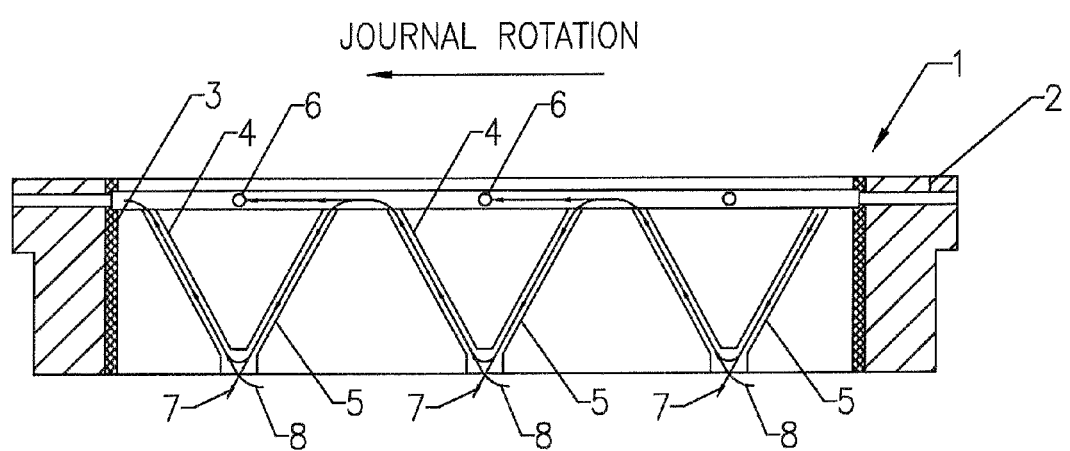

FIG. 2 presents a cross-sectional view of a conventional bearing of FIG. 1 showing a typical form of diagonal grooving for lubricating the journal and bearing surfaces. When rotating in the rotational direction shown, the diagonal grooves at one angle function as up-flowing grooves 4 and the diagonal grooves at the opposite angle function as down-flowing grooves 5 as indicated by the arrows. Any oil that is pumped up the up-flowing grooves and is not sucked into the down-flowing grooves exits the bearing through the radial drain holes 6. In reverse rotation, the functionality of these diagonal grooves reverses. Notice the conflict of the flows at the bottom of the bearing where the down-flowing grooves meet the up-flowing grooves: The down-flowing oil is directed out of the bottom surface and it flows, as shown at 7, into the path of oil 8 entering or attempting to enter the up-flowing grooves, minimizing the flow-rate of fresh cooled oil entering the up-flowing grooves.

Figure 3:
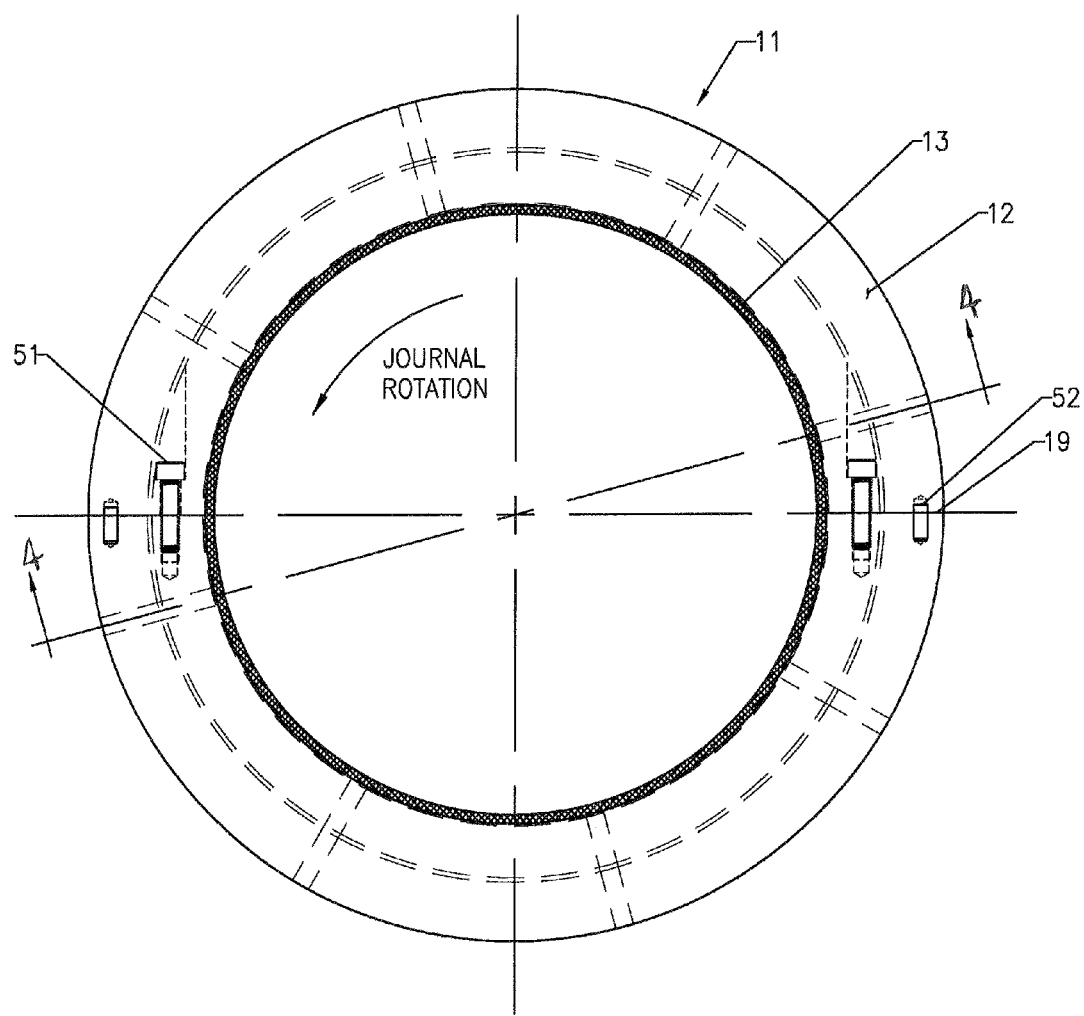

FIG. 3 illustrates another conventional vertical radial guide bearing 11 having a steel body 12 and a Babbitt lining 13, and also having typical diagonal grooving for lubricating the journal and bearing surfaces. Split line 19, along with screws 51 and dowel pins 52, permit the bearing to be split into multiple pieces for ease of assembly, a feature common to many conventional bearings.

Figure 4:
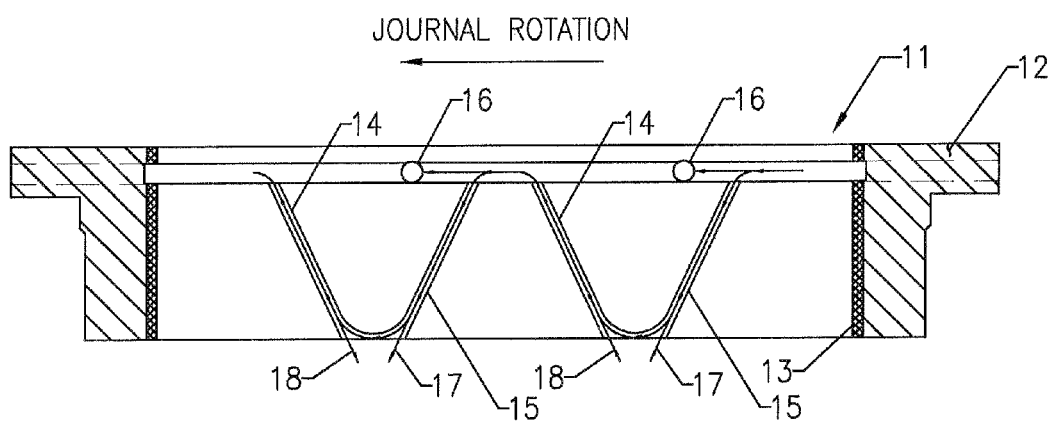

FIG. 4 presents a cross-sectional view of the conventional bearing of FIG. 3, showing a typical form of diagonal grooving for lubricating the journal and bearing surfaces. When the journal is rotating in the rotational direction shown, the diagonal grooves at one angle function as up-flowing grooves 14 and the diagonal grooves at the opposite angle function as down-flowing grooves 15 as indicated by the arrows. Any oil that is pumped up the up-flowing grooves and is not sucked into the down-flowing grooves exits the bearing through the radial drain holes 16. In reverse rotation, the functionality of these diagonal grooves reverses. Notice the conflict of the flows at the bottom of the bearing where the down-flowing grooves meet the up-flowing grooves: The down-flowing oil is directed out of the bottom surface and flows, as shown at 17, into the path of oil entering or attempting to enter the up-flowing grooves, as shown at 18, thereby minimizing the flow-rate of fresh cooled oil entering the up-flowing grooves.

Figure 5:
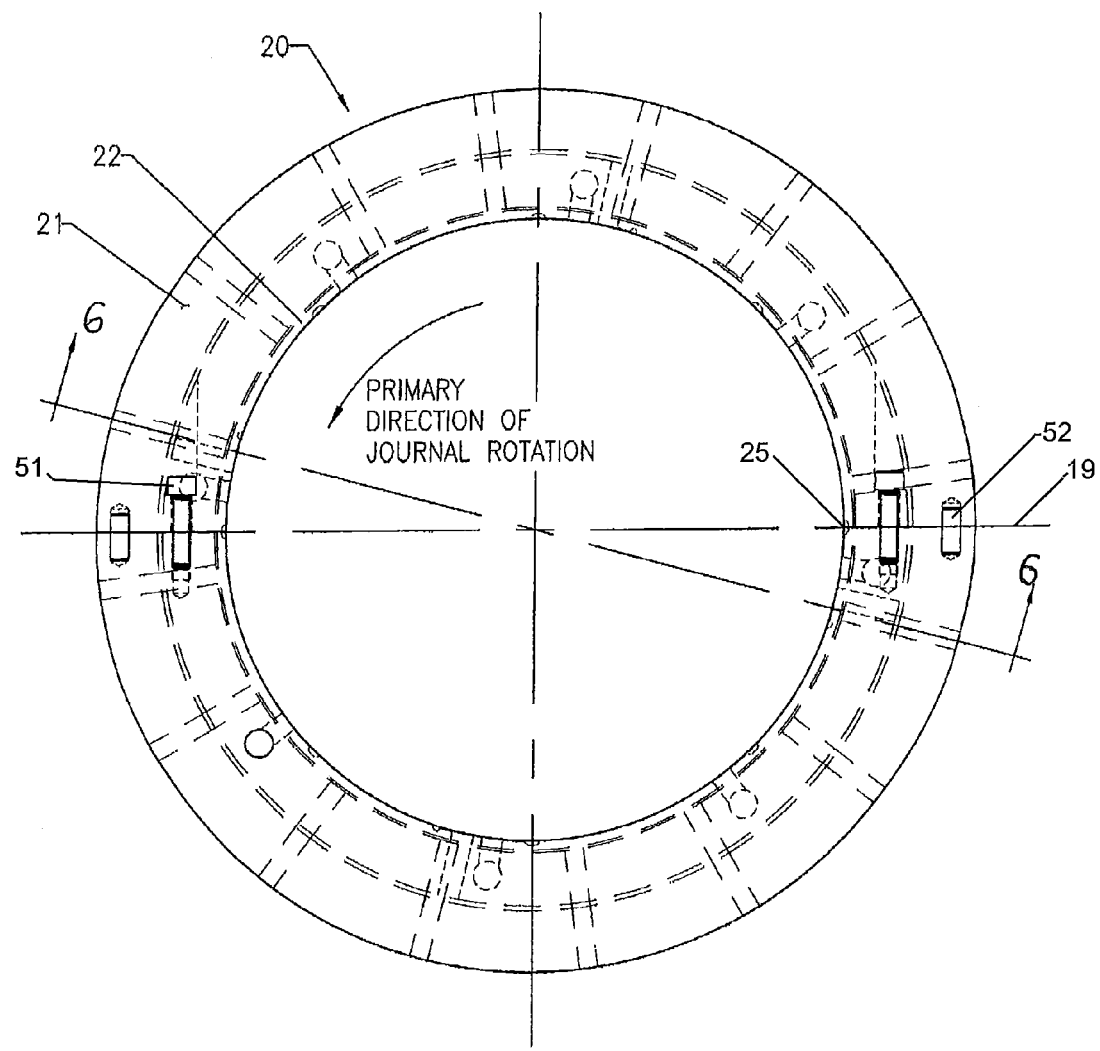
FIG. 5 is a plan view of a preferred embodiment of a bearing of this invention with an arrow representing the primary direction of rotation of a journal within the bearing.

Referring now to FIGS. 5-10 for a preferred embodiment of the bearing configuration 20 of this invention, an arrangement is provided that has similar construction to conventional vertical radial guide bearings in that the bearing housing or bearing body 21 is steel and the bearing surface is a liner 22 consisting of Babbitt chemically bonded to the bore of the bearing body, but does not use diagonal grooves in the surface of the Babbitt such as shown in FIG. 1 through FIG. 4 to supply oil to the bearing oil film. As shown in FIG. 5, in accordance with this embodiment of the present invention, the split line 19 runs through vertical grooves 25.

Figure 6:
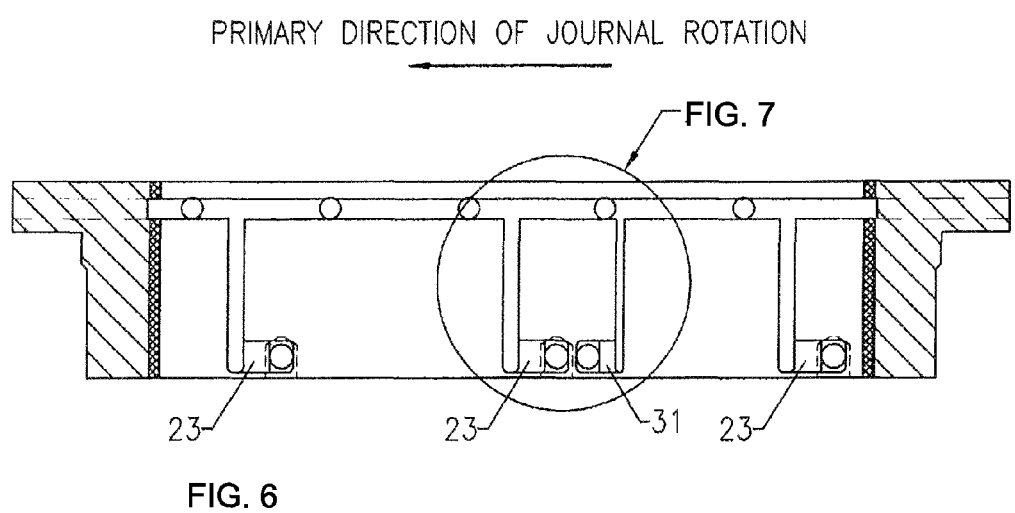
FIG. 6 is a cross-sectional view of the bearing of FIG. 5 focusing on a viscosity oil pump for primary rotation and a viscosity oil pump for reverse rotation located adjacent each other.

FIG. 6 is a schematic cross-sectional view of the bearing presented in FIG. 5, showing an improved method of supplying oil to the bearing lubricating film for which viscosity oil pumps oriented opposite to each other are employed, one orientation 23 being effective for rotation of the journal in the primary direction of rotation, and another orientation 31 being effective for rotation of the journal in the reverse direction of rotation.

Figure 7:
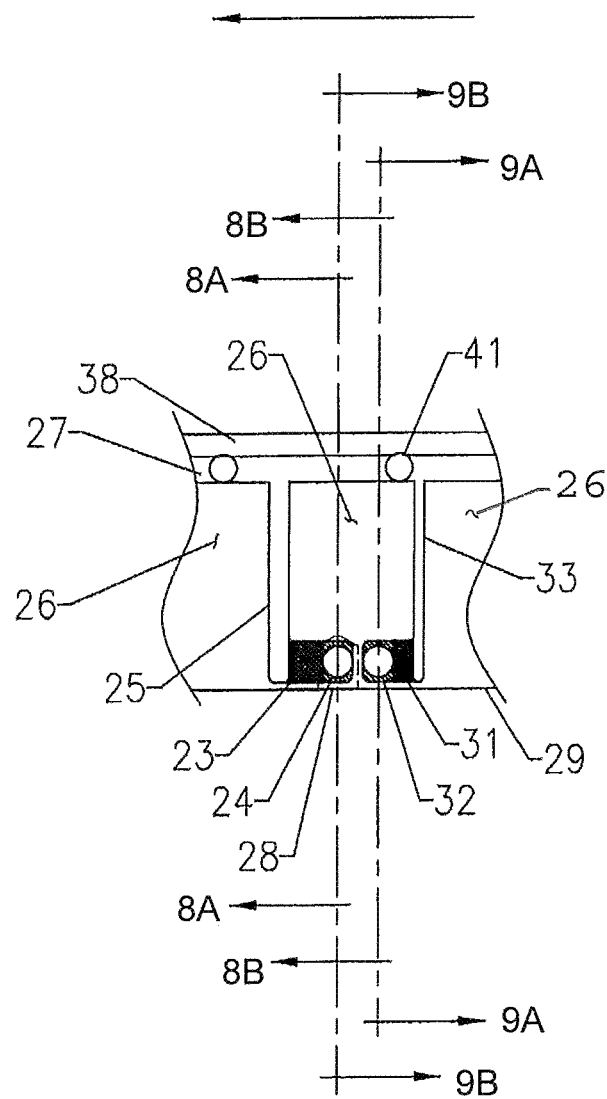
FIG. 7 is an enlarged view of a primary viscosity oil pump and associated details and an adjacent reverse viscosity oil pump and associated details.

Referring now to FIG. 7, when a journal rotates in the primary direction of rotation, viscosity oil pumps 23 with oil supply ports 24 and discharge vertical grooves 25 supply oil to the bearing lubricating film 26 and to the circumferential groove 27 adjacent the top of the bearing. During operation in reverse rotation, viscosity oil pumps 31 with supply ports 32 and discharge vertical grooves 33 supply oil to the bearing lubricating film 26 and to the circumferential groove 27 adjacent the top of the bearing. A narrow land 38 of Babbitt forms an upper boundary of the circumferential groove 27. The oil supply port 24 for the primary viscosity oil pump is a right angled passageway with entrance 28 in the bottom surface 29 of the bearing body, and the oil supply port for the reverse viscosity oil pump is a straight passageway and has an entrance in the outside surface of the bearing body.

FIG. 8 displays the oil flow pattern during operation with journal rotation in the primary direction of journal rotation. The surface 39 of the oil resident in the pot is above the viscosity oil pump slots 23, 31 and supply ports 24, 32. When rotation in the primary direction is initiated, the viscosity oil pump 23 (FIG. 8A) drives oil toward and up the discharge vertical groove 25 to lubricate the bearing 26 and simultaneously sucks in fresh cooled oil from the reservoir entering the supply port 24 through a hole 28 in the bottom 29 of the bearing body at a distance from the rotating journal surface 40. When the oil reaches the circumferential groove 27 adjacent the top of the bearing body 21, a larger portion of the oil flow 42 exits the circumferential groove through the radial drain holes 41 and a smaller portion of the oil flow 55 goes down the vertical grooves 33 associated with the viscosity oil pump 31 (FIG. 8B) for reverse rotation and is pumped out through the associated supply port 32. This oil mixes with the drain oil 42 from the top of the bearing that goes over the cooling coils 43 that are wrapped around the bearing 21. The result of these oil flows in the preferred embodiment of this bearing is that the oil is cooled in a very reliable manner.

Referring now to FIG. 9, the oil flow pattern is illustrated for operation when rotation of the journal 40 is in the reverse direction. When rotation of the journal in the reverse direction of rotation is initiated, oil in the viscosity oil pump 31 (FIG. 9A) is driven up the vertical groove 33 to lubricate the bearing 26 and to the circumferential groove 27 where it circulates and when it reaches a vertical groove 25 that is associated with a viscosity oil pump 23 (FIG. 9B) for primary rotation, oil is drawn down the vertical groove and into the primary viscosity oil pump 23 through which the oil is pumped out of the supply port 24 and entrance 28 in the bottom 29 of the bearing body to mix with the oil resident in the pot. Because the reverse viscosity oil pumps can pump more oil upward to the film than the diagonal grooves of conventional bearings can and because the supply of oil to the viscosity oil pumps of both orientations is cooled better and comes through entrance passageways in the body of the bearing that are at some distance from the journal surface and consequently have less turbulence, the preferred embodiment of a vertical guide bearing provides improvements for supplying oil to the journal and bearing surfaces and to the film that separates these surfaces for both primary and reverse directions of rotation.

The steel backing of the bearing can be either new or reclaimed from an existing bearing that was manufactured with a Babbitt lining with diagonal grooves. Therefore, a bearing can be manufactured to the same specifications whether using completely new materials, or manufactured using a previously used steel bearing body and new Babbitt material. There is no appreciable difference in the functioning of the final product made via either method.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A vertical radial guide bearing comprising a body defining a bore sized to surround a journal of a vertical shaft-line and to form a close clearance with the journal, the bore being lubricated by a pot lubrication system wherein the surface of the oil in the pot only partially floods the bearing from bottom to top, the pot lubrication system comprising:
   a plurality of viscosity oil pumps, each viscosity oil pump comprising:
      a slot in a surface of the bearing bore adjacent the bottom of the bearing, said viscosity oil pump slot being located entirely below the surface of the oil in the pot,
      an oil supply port communicating through the body between the pot and the slot, oriented to supply oil to an upstream portion of the slot when the journal rotates in a primary direction, and
      a discharge groove communicating with and extending from a downstream portion of the slot vertically upward across the bearing surface in an orientation to receive oil from the slot when the journal rotates in a primary direction,
   the lubrication system further comprising:
      a circumferential groove adjacent the top of the bearing, the circumferential groove communicating with the vertical discharge groove, and
      drain holes from the circumferential groove adjacent the top of the bearing to the outside of the bearing, into the pot above the surface of the oil in the pot.

2. The bearing of claim 1 wherein the plurality of viscosity oil pumps are of the same configuration.

3. The bearing of claim 2 comprising at least one additional viscosity oil pump, said additional viscosity oil pump comprising:
  a slot in the surface of the bearing bore adjacent the bottom of the bearing, said viscosity oil pump slot being located entirely below the surface of the oil in the pot,
  an oil supply port communicating through the body between the pot and the slot, oriented to supply oil to an upstream portion of the slot when the journal rotates in a direction that is the reverse of the primary direction, and
  a discharge groove extending from the shallow slot or groove vertically upward across the bearing surface in an orientation to receive oil from the slot when the journal rotates in a direction that is the reverse of the primary direction of journal rotation.

4. The bearing of claim 3 wherein the level of the surface of oil resident in the pot is in the range of one quarter to one third of the distance up the height of the bearing.

5. The bearing of claim 3 wherein the bearing body is made of steel and a layer of Babbitt is chemically bonded to the bore of the bearing, thereby providing a bearing bore made of Babbitt.

6. The bearing of claim 3 wherein the bearing body is vertically split to form multiple sectors and the split lines are located in at least some of the vertical discharge grooves.

7. The bearing of claim 2 wherein the level of the surface of the oil resident in the pot is in the range of one quarter to one third of the distance up the height of the bearing.

8. The bearing of claim 2 wherein the bearing body is made of steel and a layer of Babbitt is chemically bonded to the bore of the bearing, thereby providing a bearing bore made of Babbitt.

9. The bearing of claim 2 wherein the bearing body is vertically split to form multiple sectors and the split lines are located in at least some of the vertical discharge grooves.

10. The bearing of claim 1 wherein cooling coils are provided in said pot, said drain oil flowing through said drain holes from the circumferential groove adjacent the top of the bearing into the oil reservoir, being retained in the pot, and subsequently flowing over the cooling coils and returning to said supply ports to the viscosity oil pumps, thereby permitting oil to recirculate through the journal bearing.

11. The bearing of claim 1 wherein the number and size of said viscosity oil pumps are adequate to quickly lubricate the journal and bearing surfaces after start-up with rotation in the primary direction of journal rotation thereby permitting a full oil film to develop within a single rotation of the shaft-line, with adequate pressure and film thickness by means of normal hydro-dynamic action sufficient to separate and to keep separated the journal from the bearing and to provide excess oil to pass through the drain holes.

12. A vertical radial guide bearing comprising a body defining a bore sized to surround a journal of a vertical shaft-line having a diameter of about ten to sixteen inches and to form a close clearance with the journal, the bore being lubricated by a pot lubrication system wherein the surface of the oil in the pot only partially floods the bearing from bottom to top, the pot lubrication system comprising:
  four to ten viscosity oil pumps, each comprising:
    a slot in a surface of the bearing bore adjacent the bottom of the bearing, said viscosity oil pump slot being located entirely below the surface of the oil in the pot,
    an oil supply port communicating with the slot at an upstream portion of the slot in the direction of primary rotation of the journal, and
    an associated discharge groove communicating with the slot and extending from a downstream portion of the slot in the direction of primary rotation and vertically upward across the bearing surface, the lubrication system further comprising:
  a circumferential groove adjacent the top of the bearing, the circumferential groove communicating with the vertical discharge groove, and
  drain holes from the circumferential groove adjacent the top of the bearing to the outside of the bearing, into the pot above the surface of the oil in the pot.

13. The bearing of claim 12 wherein each slot in the bearing bore surface is about 0.75 inches (16 mm) in axial length vertically, from 0.5 to 1.0 inches (12 to 25 mm) in circumferential arc length, and about 0.030 inches (0.75 mm) deep.

14. The bearing of claim 12 further comprising two to five additional viscosity oil pumps, said additional viscosity oil pumps each comprising:
  a slot in the surface of the bearing bore adjacent the bottom of the bearing, said viscosity oil pump slot being located entirely below the surface of the oil in the pot,
  an oil supply port communicating through the body between the pot and the slot, oriented to supply oil to an upstream portion of the slot when the journal rotates in a direction that is the reverse of the primary direction, and
  a discharge groove extending from the shallow slot or groove vertically upward across the bearing surface in an orientation to receive oil from the slot when the journal rotates in a direction that is the reverse of the primary direction of journal rotation.

15. The bearing of claim 14 wherein each slot in the bearing bore surface is about 0.75 inches (16 mm) in axial length vertically, from 0.5 to 1.0 inches (12 to 25 mm) in circumferential arc length, and about 0.030 inches (0.75 mm) deep.

16. The bearing of claim 14 wherein the bearing body is made of steel and a layer of Babbitt is chemically bonded to the bore of the bearing, thereby providing a bearing bore made of Babbitt.

17. The bearing of claim 12 wherein the number and size of said viscosity oil pumps are adequate to quickly lubricate the journal and bearing surfaces after start-up with rotation in the primary direction of journal rotation thereby permitting a full oil film to develop within a single rotation of the shaft-line, with adequate pressure and film thickness by means of normal hydro-dynamic action sufficient to separate and to keep separated the journal from the bearing and to provide excess oil to pass through the drain holes.

18. A vertical radial guide bearing adapted to surround a journal of a vertical shaft-line with a close clearance between journal and bearing, the bearing being constructed to be lubricated by a pot lubrication system wherein the surface of the oil in the pot only partially floods the bearing from bottom to top and recirculates through the bearing, when the journal rotates in a primary direction,
  said bearing having a surface of the bore that has a plurality of primary viscosity oil pumps, each primary viscosity oil pump comprising:
    a slot in the surface of the bearing bore adjacent the bottom of the bearing, the slot extending vertically no higher than the mid-point of said surface, an oil supply port communicating with the slot at an upstream portion of the slot in the direction of primary rotation of the journal, and a discharge groove extending from a downstream portion of the slot in the direction of primary rotation and vertically upward across the bearing surface until it reaches a circumferential groove adjacent the top of the bearing.

19. The bearing of claim 18 comprising at least one additional viscosity oil pump, said additional viscosity oil pump comprising:

a slot in the surface of the bearing bore adjacent the bottom of the bearing, said viscosity oil pump slot being located entirely below the surface of the oil in the pot, an oil supply port communicating through the body between the pot and the slot, oriented to supply oil to an upstream portion of the slot when the journal rotates in a direction that is the reverse of the primary direction, and a discharge groove extending from the shallow slot or groove vertically upward across the bearing surface in an orientation to receive oil from the slot when the journal rotates in a direction that is the reverse of the primary direction of journal rotation.

* * * * *